UNITED STATES PATENT OFFICE.

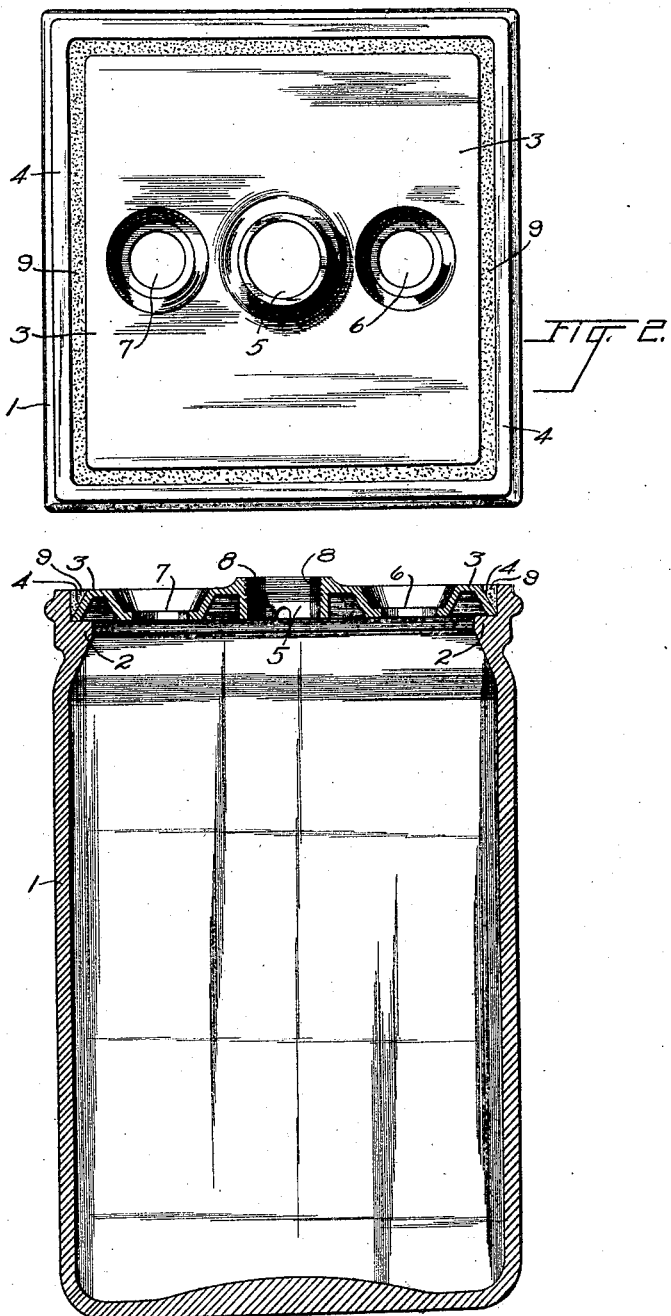

ROBERT D. MOWRY, OF CHICAGO, ILLINOIS.

STORAGE-BATTERY CELL.

1,415,257.    Specification of Letters Patent.    Patented May 9, 1922.

Application filed April 12, 1920. Serial No. 373,159.

*To all whom it may concern:*

Be it known that I, ROBERT D. MOWRY, a citizen of the United States, and a resident of the city of Chicago, in the county of Cook and State of Illinois, have invented a new and useful Improvement in Storage-Battery Cells, of which the following is a full, clear, and exact description.

My invention relates to improvement in storage battery cells, and it consists in the combinations, constructions and arrangements herein described and claimed.

An object of my invention is to provide a transparent battery cell having a cover portion which may be sealed while the cell is in its upright position and which may be readily removed without danger of breaking the top nor of any necessity of tilting the cell from its upright position.

A further object of my invention is to provide a sealing means for storage battery cells in which the sealing compound is readily applied so as to seal the top effectively, while providing a firm and substantial support therefor during the sealing process.

A further object of my invention is to provide a cell having an inwardly protecting flange which acts as a support for the entire lower edge of the top, thereby preventing the warping of the top and which also acts as a reenforcing means for the cell itself.

Other objects and advantages will appear in the following specification and the novel features of the invention will be particularly pointed out in the appended claims.

My invention is illustrated in the accompanying drawings, forming part of this application in which—

Figure 1 is a vertical sectional view of the device, and

Figure 2 is a plan view.

Battery jars in the past have been built with straight sides. The usual practice is to place a hard rubber cover between the positive and the negative straps, the top being covered completely with a sealing compound. This forms a fairly tight seal but when it is desired to repair the battery it is almost impossible to remove the top without breaking it.

In other forms of batteries it is necessary to invert the jar in order to remove the top. Both of these methods of sealing the top liable to injury while being removed. The purpose of the present invention is to overcome these difficulties.

In carrying out my invention, I provide a jar 1 which is preferably made of cast glass having an inwardly projecting flange or shoulder 2 near its top. A cover 3 is provided having a beveled outer edge 4 which is arranged to rest on the flange 2. The cover is provided with the usual openings 5, 6, and 7 the opening 5 being threaded at 8 to receive a removable cap (not shown) and the openings 6 and 7 being arranged for the positive and negative straps (not shown.)

In applying the cover it is only necessary to place the same on the shoulder or flange 2 and then to run, between the beveled edges 4 and the sides of the jar, a sealing compound 9, when the jar is effectively sealed. This leaves a jar having a neat looking top, since the sealing compound is in the groove between the beveled sides of the top and the sides of the jar. The sealing compound cannot run into the jar because of the flange 2. The compound may be melted and run in very quickly and left to harden. When it is desired to remove the cover, all that is necessary to do is to run a hot knife around the groove in which the sealing compound is disposed so as to separate the cover from the jar, whereby the cover may be immediately lifted off, without any danger of breaking.

The flange or shoulder 2 forms a support for the entire under edge of the cover and thereby preventing the warping of the latter which is very apt to occur where it is not supported all around the bottom. Furthermore the flange 2 forms a strengthening rib for the jar. It also forms a bottom for the groove in which the sealing compound is run. It therefore serves a triple function. The jar or cell described above may be readily inspected since it is transparent and may be repaired without tilting the jar from its normal position.

I claim:

1. A storage battery cell comprising a rectangular jar having an inwardly projecting strengthening rib or flange near its upper end and being provided with unrestricted straight sides below said flange, a rectangular cover of insulating material having beveled side edges extending from the upper face of the cover to the lower edge thereof, the lower edge of the cover being arranged to rest on the inwardly projecting flange, whereby a V-shaped groove is formed between the cover and the sides of the jar above the flange, and a sealing material disposed in said V-shaped groove for sealing said cover to said jar.

2. A storage battery cell comprising a rectangular transparent jar of insulating material, an inwardly projecting supporting and strengthening shoulder or flange extending around the interior side walls of the jar near the upper end thereof, the interior side walls of the jar being straight and unrestricted above and below said shoulder, a hard rubber cover having beveled sides, the bottom of the cover being arranged to rest on said flange whereby a V-shaped groove is formed between the sides of said cover and the side walls of the jar above the flange and sealing material disposed in said V-shaped groove for sealing said cover to said jar.

ROBERT D. MOWRY.